United States Patent [19]
Kook

[11] 3,987,981
[45] Oct. 26, 1976

[54] ROLL CONTROL FOR AIRCRAFT, PARTICULARLY FLYING BARRELS, ADAPTED TO BE DRIVEN BY MEANS OF DUCTED FANS

[75] Inventor: Dieter Kook, Friedrichshafen, Germany

[73] Assignee: Dornier System GmbH, Germany

[22] Filed: Aug. 25, 1975

[21] Appl. No.: 607,518

Related U.S. Application Data

[63] Continuation of Ser. No. 521,039, Nov. 5, 1974, abandoned.

[30] Foreign Application Priority Data

Dec. 20, 1973 Germany.............................. 2363496

[52] U.S. Cl................................. 244/12 D; 244/34 A
[51] Int. Cl.²........................................ B64C 15/06
[58] Field of Search............ 244/12, 13, 34 R, 34 A, 244/23; 416/189, 192

[56] References Cited
UNITED STATES PATENTS

| 2,907,536 | 10/1959 | Von Zborowski | 244/34 A |
| 2,929,580 | 3/1960 | Ciolkosz | 244/34 A |
| 2,969,936 | 1/1961 | Dorman et al. | 244/34 A |

Primary Examiner—Trygve M. Blix
Assistant Examiner—Galen L. Barefoot
Attorney, Agent, or Firm—James E. Bryan

[57] ABSTRACT

This invention relates to an improvement in an aircraft driven by a ducted fan and having a displaceable louver at the end of the flow channel for vertical flight, hovering flight, transition, and high-speed flight, the improvement comprising a vertical separating surface dividing the flow channel into two flow channels, and at least one vertical flap, pivotal about a vertical axis, mounted on the forward edge of said separating surface, whereby roll control may be effected.

2 Claims, 4 Drawing Figures

ROLL CONTROL FOR AIRCRAFT, PARTICULARLY FLYING BARRELS, ADAPTED TO BE DRIVEN BY MEANS OF DUCTED FANS

This is a continuation of application Ser. No. 521,039, filed Nov. 5, 1974, now abandoned.

The present invention relates to a roll control for aircraft, particularly flying barrels, adapted to be driven by means of ducted fans, which comprise at the end of the flow channel a pivotal reversing or deflecting louver for vertical flight, hovering flight, transition, and high-speed flight.

An aircraft is known under the name of "Aerodyne" (Dornier Post 1-1973, page 17 et sequitur) in which a flow channel is present within a fan shroud, at the end of which the jet may be reversed or deflected downwardly by a series of flaps. The exhaust gas jet of the propulsion unit is guided rearwardly at the inside of the tail boom and there serves for the yaw and pitch control in hovering flight. During high-speed flight, the pitch and yaw controls are effected by the control surfaces of a conventional tail unit at the end of the tail boom. The roll control is effected in hovering flight and in forward flight by means of a vertical keel flap which is mounted immediately behind the main cascade flaps and which, by virtue of its mounting under the center of gravity, furnishes a rolling moment during the deflection.

It is the object of the present invention to provide for an effective roll control for aircraft, particularly flying barrels, with ducted fans, which requires only a moderate number of mechanically movable parts, and which is readily responsive.

This object is obtained, in accordance with the present invention, in the case of aircraft provided with a ducted fan by virtue of the fact that the flow channel is subdivided into two flow channels by a vertical separating surface, and that mounted at the leading edge of the separating surface is at least one vertical flap which is pivotal about a vertical axis. By means of flaps behind the impeller, the flow may be unilaterally so deflected that one part of the reversing louver produces a greater thrust than the other, which leads to the generation of a rolling moment.

According to another advantageous embodiment of the present invention, the space between the impeller and the reversing louver is subdivided, by a cell enclosing the drive aggregate, into two channels extending substantially vertically, and vertical flaps guide the flow coming from the impeller into one channel or the other. Thereby also rolling movements may be sensitively initiated or compensated for.

Further advantages, features, and possibilities of application of the present invention will become apparent from the accompanying drawings, the figures of which are described hereinbelow and wherein FIG. 1 is an illustration, in principle, of an inventive aircraft during high-speed flight;

Figure 1:
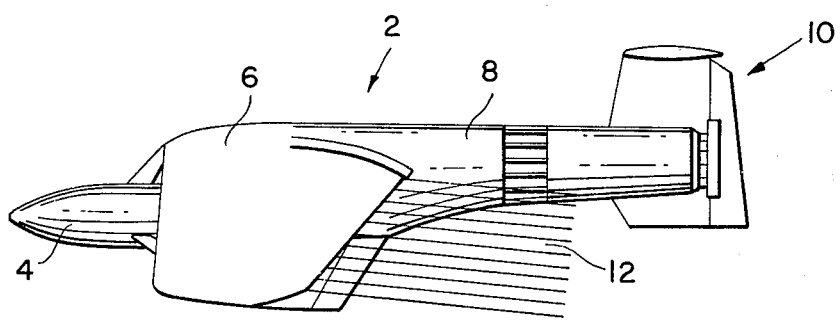
Figure 2:
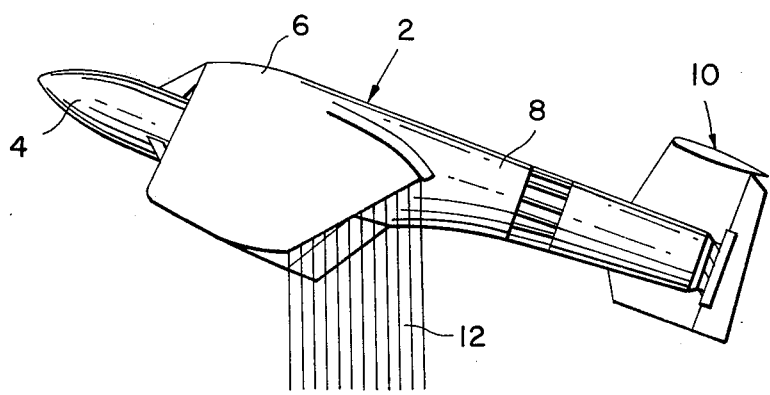
FIG. 2 illustrates a flying barrel according to FIG. 1 in vertical flight.

FIG. 1 shows an aircraft 2 of the flying barrel type during high-speed flight. The aircraft 2 is composed of a useful load tip 4, a propulsion unit (not visible in FIGS. 1 and 2), a shroud 6, a tail boom 8, and a tail unit 10. During high-speed flight, the flow 12 is only slightly deflected in a direction opposite to the force of gravity, whereas during vertical flight and the transitional phase, the deflection is considerably greater, as shown in FIG. 2.

Figure 3:
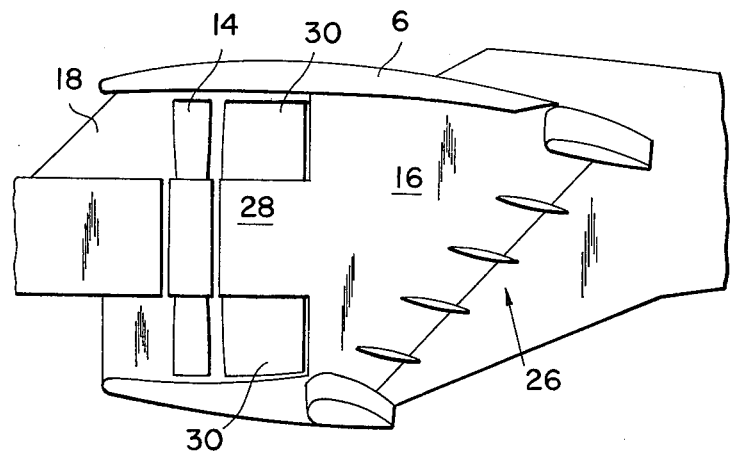
FIG. 3 is a side view, partially in cross-section, of an inventive aircraft according to FIGS. 1 and 2.

The cross-sectional view of FIG. 3 illustrates the interior of the shroud 6. The flow 12 is generated by means of an impeller 14 which is provided with adjustable blades. The shaft turbine required for the drive of the impeller 14 is mounted within a cell 16 which is shown in a top plan view in FIG. 4. The cell 16 subdivides the inner flow channel 18 into two flow channels 20 and 22. The divided flow 12 is deflected by two separate deflecting louvers or cascades 24 and 26 in a direction opposite to the force of gravity. The cell 16 is so constructed that it extends in a wedge-shaped manner-forwardly up into the vicinity of the impeller 14. It divides the flow channel 18 in a vertical plane. The two flow channels 20 and 22 have similar cross-sectional surfaces and guide the flow toward the two deflecting louvers 24 and 26 without contour jumps, which louvers either may be positioned parallel with respect to each other, or form a V with each other.

It is thus possible, by means of influencing the cross-sectional surfaces of the flow channels 20 and 22, to so control the mass flow of the flow 12 that a thrust difference is produced between the two louvers 24 and 26, and therewith a rolling moment.

Figure 4:
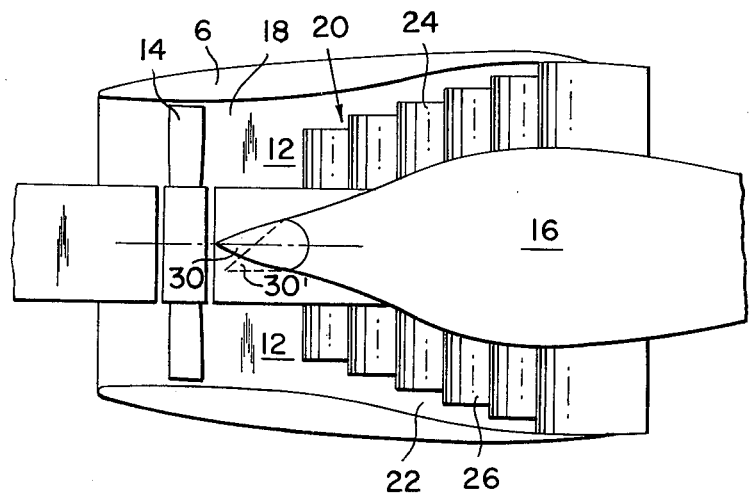
FIG. 4 is a view, in horizontal cross-section, according to FIG. 3.

For this purpose, the front part of the cell 16 above and below a hub 28 is constructed as the flaps 30. The two flaps 30 are deflected simultaneously toward the same side for effecting roll control, whereby the mass flow in one flow channel, 20 or 22, is increased and diminished in the other. The extent of the deflecting angle of the flaps 30 is dependent upon the required rolling moment. Shown in full lines in FIG. 4 is a flap 30 in the neutral position thereof, and in phantom 30' when producing a rolling moment.

The roll control by means of a differentiated subdivision of the mass flow 12 to the louvers 24 and 26, by means of the flaps 30 arranged behind the impeller 14 is characterized by simplicity, low structural weight, and a high degree of effectiveness. Also utilized are the advantages of a central structural group of the cell 16 as a compact drive unit which contains the propulsion unit, gear mechanism, fan, and tank system. As a result, no large forces need to be guided through the shroud any longer. Jet rudders in the flow behind the louvers 24 and 26 which deflect the main thrust vector for the roll control are not necessary.

It will be obvious to those skilled in the art that many modifications may be made within the scope of the present invention without departing from the spirit thereof, and the invention includes all such modifications.

What is claimed is:

1. A roll control for an aircraft capable of gliding, comprising a single shrouded engine mounted in the longitudinal plane of said aircraft,
   a ducted fan adapted to be driven by said engine,
   vertical partition means downstream of said fan and forming two separate flow channels,
   deflection baffle means at the end of each of said flow channels, and roll control means comprising at least one flap means mounted on said partition means downstream of said fan and rotatable about a vertical axis for deflecting part of the flow of one of said flow channels to the other of said flow channels for effecting a rolling moment by increasing the flow over the baffle means of said other flow channel when said baffle means is inclined with respect to the horizontal.

2. A roll control for an aircraft capable of gliding, comprising a single shrouded engine mounted in the longitudinal plane of said aircraft,
a ducted fan adapted to be driven by said engine,
vertical partition means mounted downstream of said fan and forming two separate flow channels,
deflection baffle means at the end of each of said flow channels,
and a pair of coupled flap means mounted on said partition means downstream of said fan and having a stationary hub between them,
said flap means being together rotatable in the same direction about a vertical axis for altering the flow from said fan in said flow channels to increase the flow in one of said flow channels and over one of said deflection baffle means to effect a rolling moment about the central aircraft axis when said baffle means is inclined with respect to the horizontal.

* * * * *